(12) United States Patent
Zhan et al.

(10) Patent No.: US 6,948,896 B2
(45) Date of Patent: Sep. 27, 2005

(54) LOAD RESTRAINING DEVICE

(75) Inventors: Mark Y. Zhan, Shanghai (CN); Stuart H. Thomson, Downers Grove, IL (US)

(73) Assignee: Holland L.P., Crete, IL (US)

( * ) Notice: Subject to any disclaimer, the term of this patent is extended or adjusted under 35 U.S.C. 154(b) by 0 days.

(21) Appl. No.: 10/280,348

(22) Filed: Oct. 25, 2002

(65) Prior Publication Data

US 2003/0129039 A1 Jul. 10, 2003

Related U.S. Application Data

(60) Provisional application No. 60/343,106, filed on Oct. 25, 2001.

(51) Int. Cl.[7] ............................................. B61D 45/00
(52) U.S. Cl. ...................... 410/117; 410/129; 410/100
(58) Field of Search ................................. 410/117, 118, 410/129, 130, 97, 100, 116

(56) References Cited

U.S. PATENT DOCUMENTS

| | | | | | |
|---|---|---|---|---|---|
| 2,170,913 | A | * | 8/1939 | Rowe | |
| 2,455,237 | A | * | 11/1948 | Davis | |
| 3,767,253 | A | * | 10/1973 | Kluetsch | |
| 3,897,919 | A | * | 8/1975 | Weingarten | 105/467 |
| 3,961,585 | A | * | 6/1976 | Brewer | 105/469 |
| 4,083,312 | A | * | 4/1978 | Holman, Jr. | 105/469 |
| 4,846,610 | A | * | 7/1989 | Schoenleben | 410/96 |
| 5,452,973 | A | * | 9/1995 | Arvin | 410/118 |
| 5,458,447 | A | * | 10/1995 | Clason | 410/100 |
| 5,494,387 | A | * | 2/1996 | Ruegg | 410/103 |
| 6,030,158 | A | * | 2/2000 | Tatina et al. | 410/100 |
| 6,099,221 | A | * | 8/2000 | Takagi | 410/97 |
| 6,123,294 | A | * | 9/2000 | Genovese | 244/110 C |
| 6,183,177 | B1 | * | 2/2001 | Dahlgren | 410/100 |
| 6,244,803 | B1 | * | 6/2001 | Parish et al. | 410/97 |
| 6,422,794 | B1 | | 7/2002 | Zhan et al. | |
| 6,494,651 | B1 | * | 12/2002 | Zhan et al. | 410/116 |
| 6,514,022 | B2 | * | 2/2003 | Truckor et al. | 410/138 |

\* cited by examiner

Primary Examiner—H. Gutman
(74) Attorney, Agent, or Firm—Barnes & Thornburg LLP

(57) ABSTRACT

A load restraining device provides a system in which straps extending from one side of a web strap arrangement initially run parallel to the wall to which they are connected, as opposed to extending perpendicular to the wall as in the prior art. The anchor itself is a horizontal wall member running longitudinally along the wall of the railcar or trailer. An adjustable anchor is used to permit moving the attachment point several inches to allow for load variations. The attachment of the web strap arrangement is normally 14" to 18" behind the face of the load. Unlike previous systems, this provision of anchor points behind the load effectively "encapsulates" the load rather than merely providing a bulkhead effect. Ratchets provided as part of one of the wall anchor arrangements allow the web straps to be tightened into final position, imparting a restraining force to the load and preventing the load from shifting during transport. A removable load restraining system using multiple restraining net portions and flush-mounted anchor assemblies is also described.

13 Claims, 17 Drawing Sheets

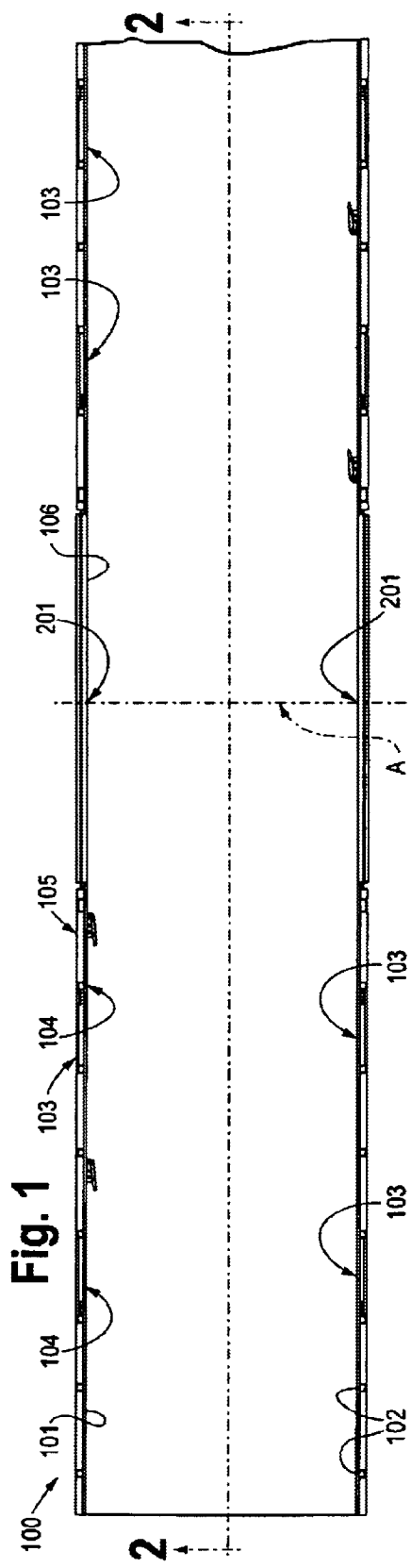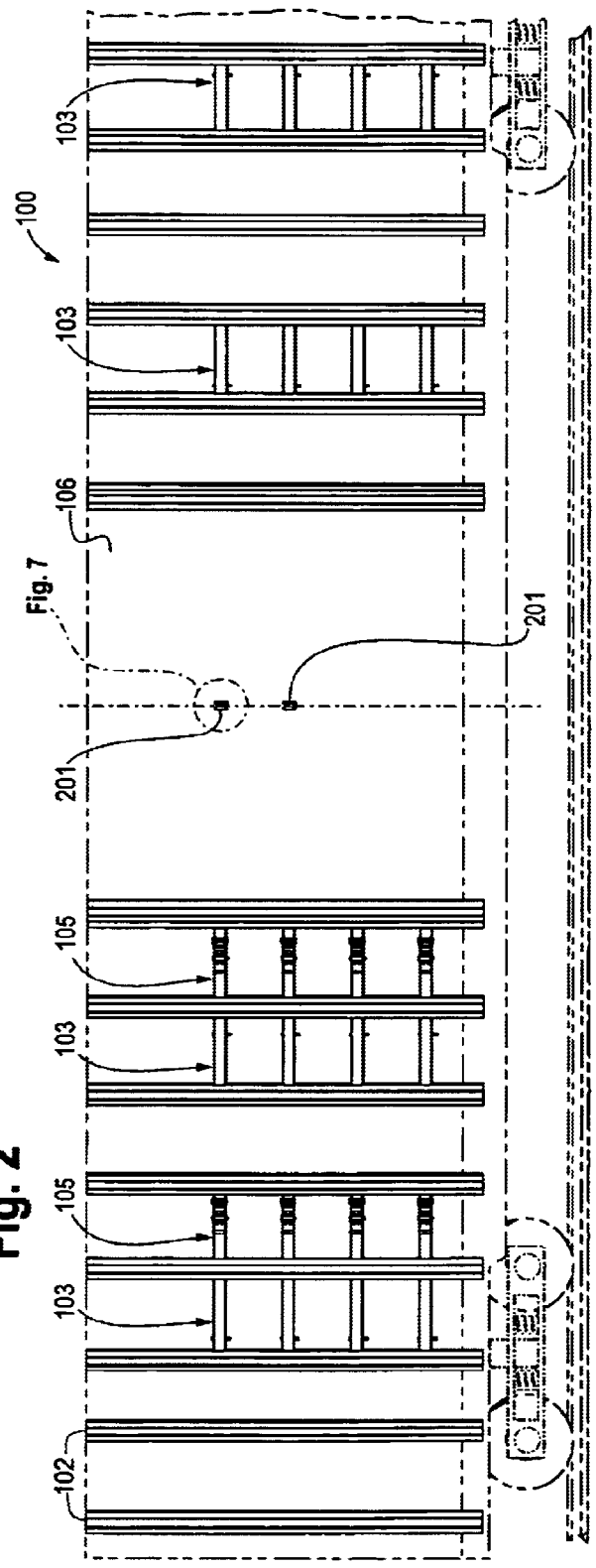

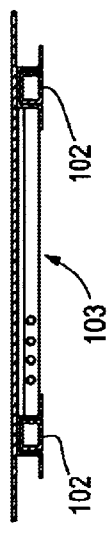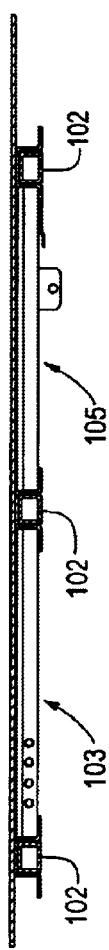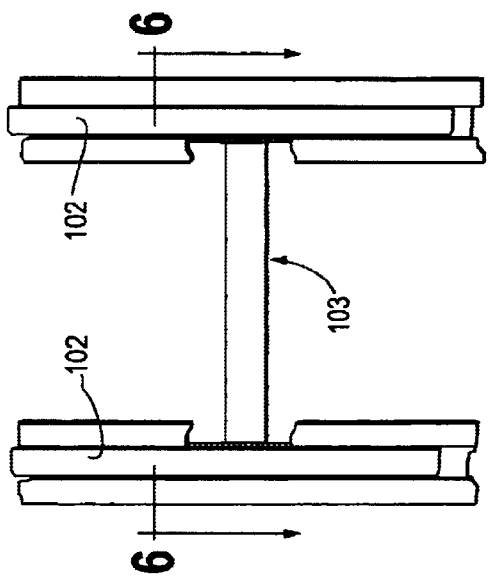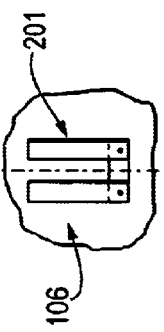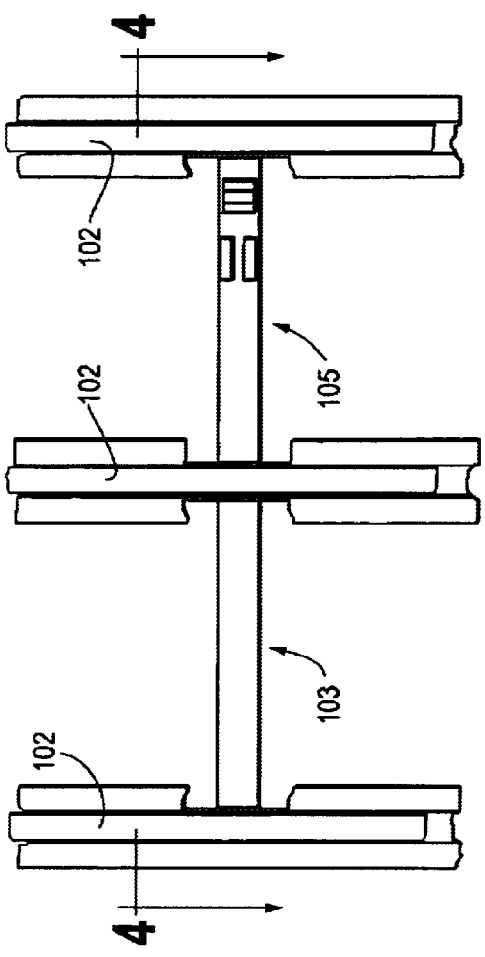

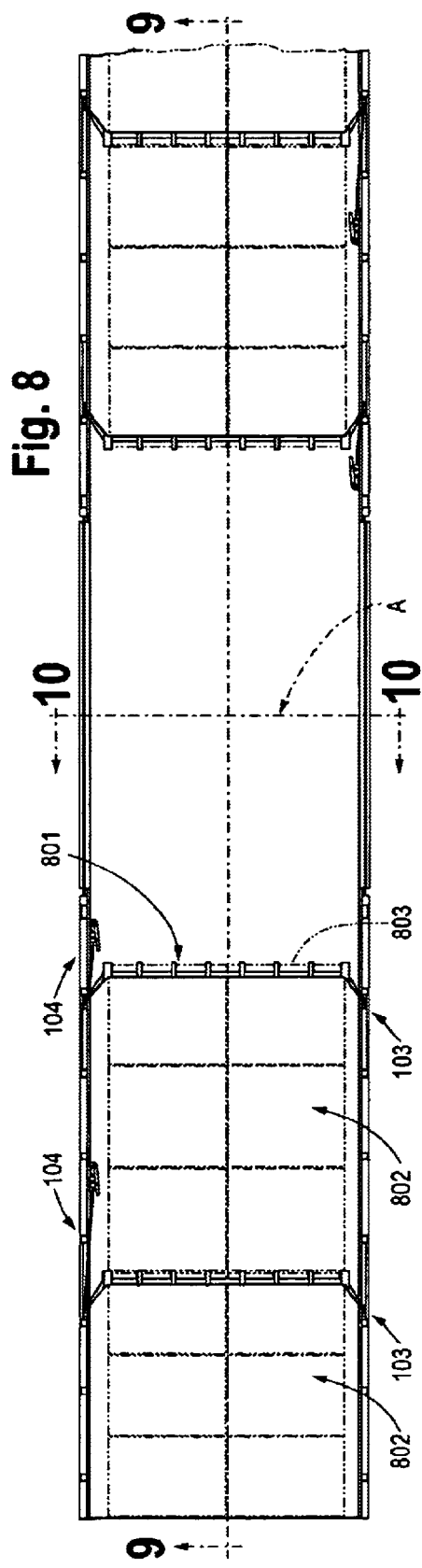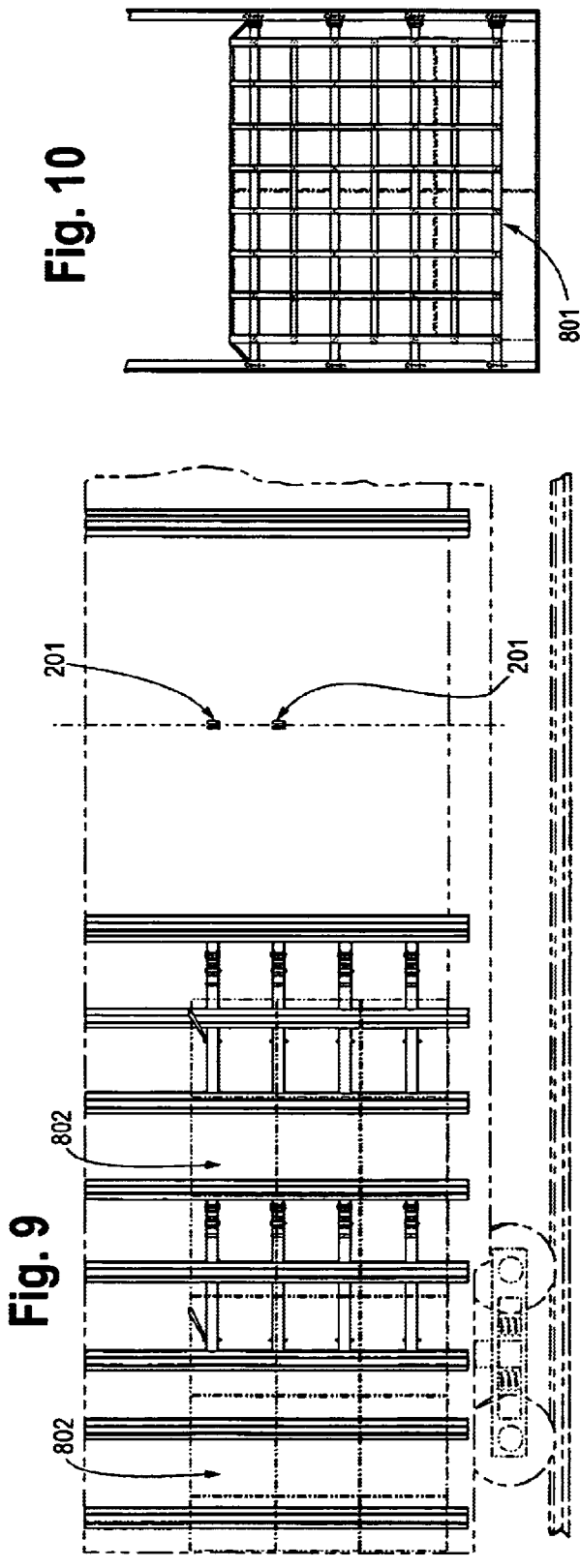

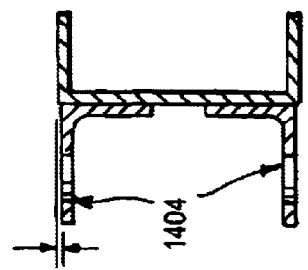
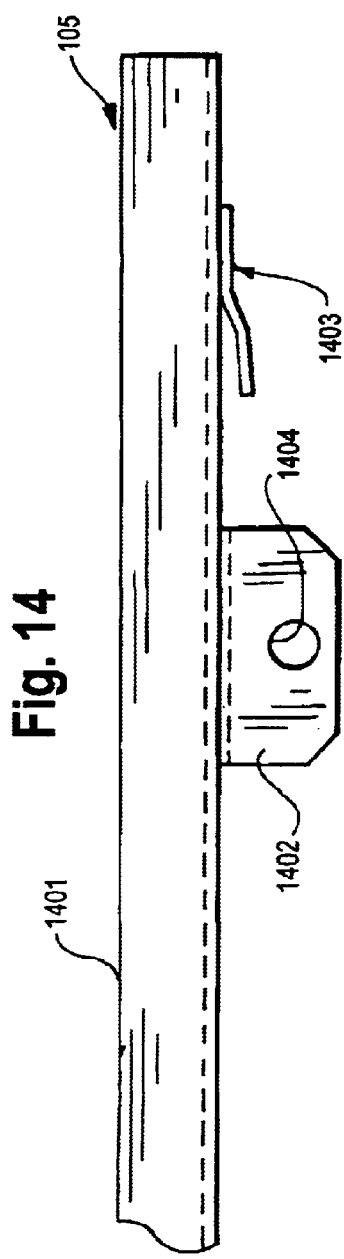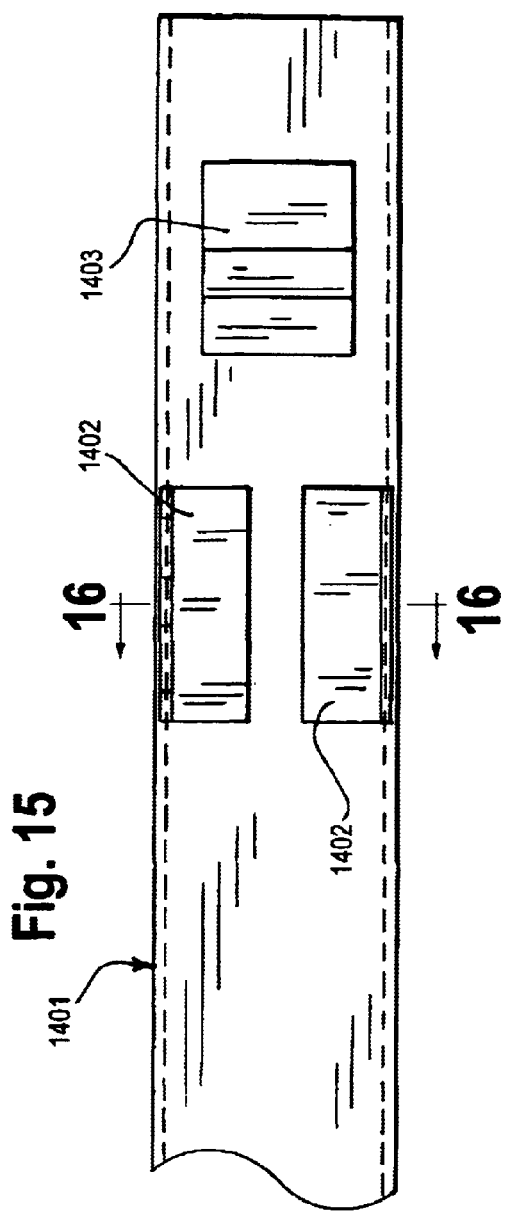

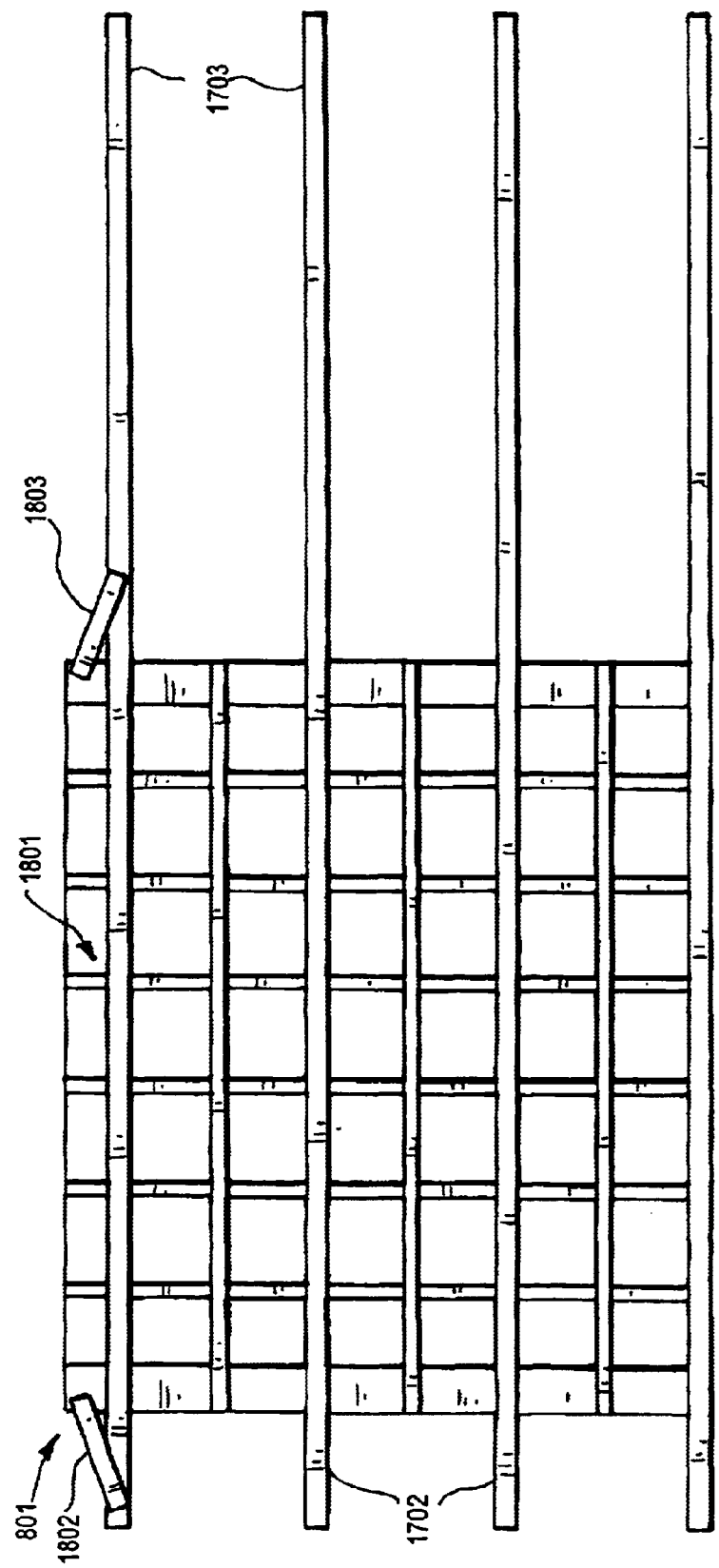

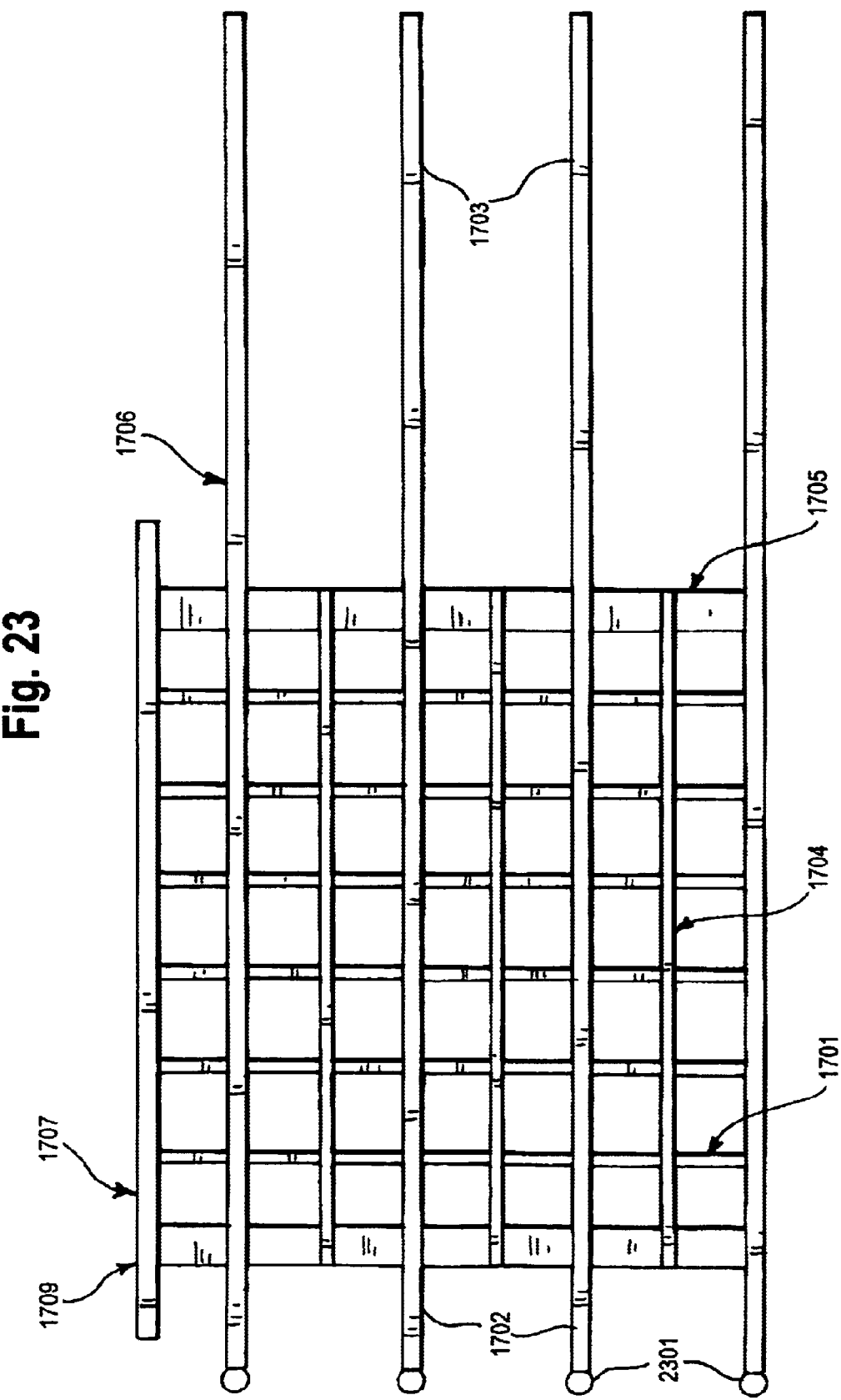

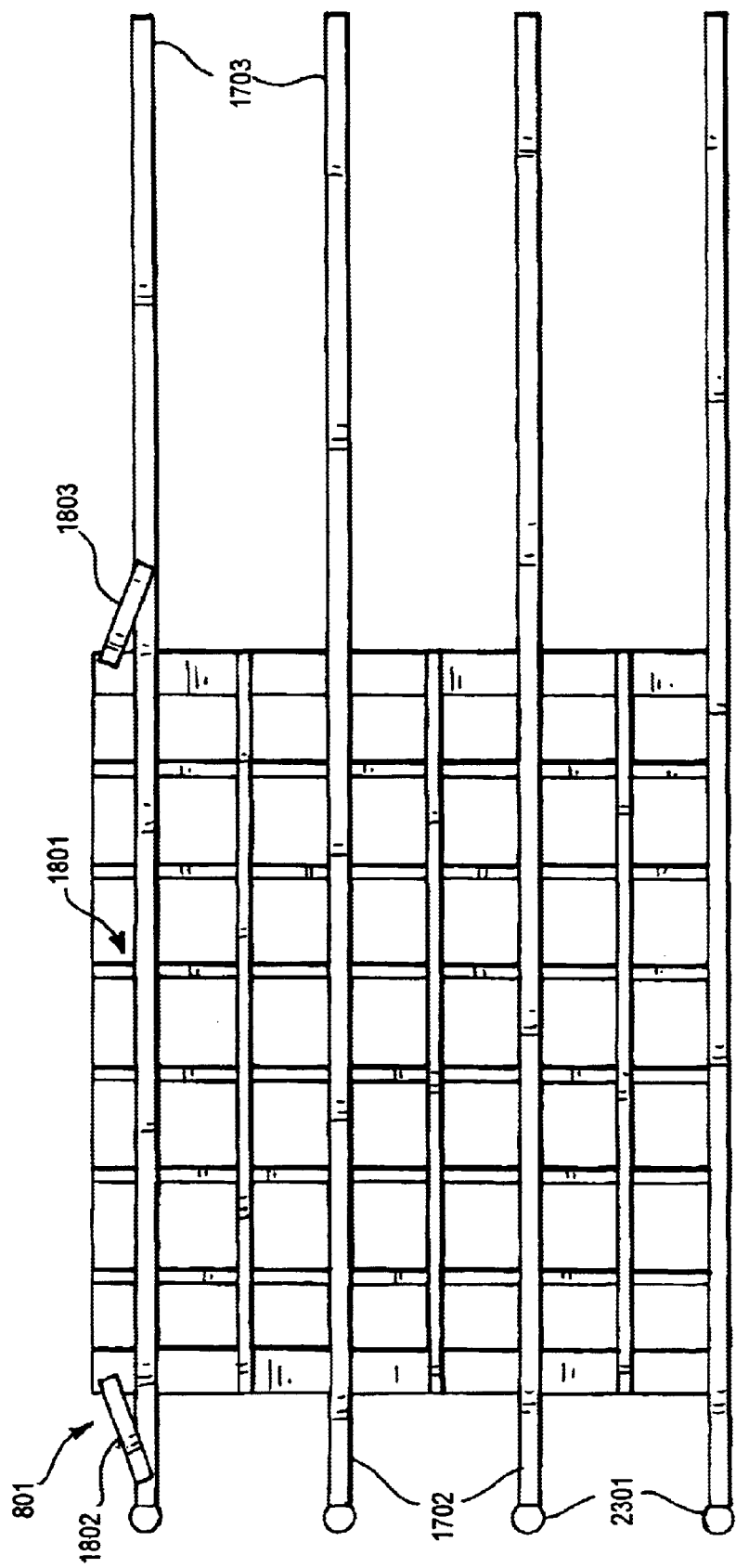

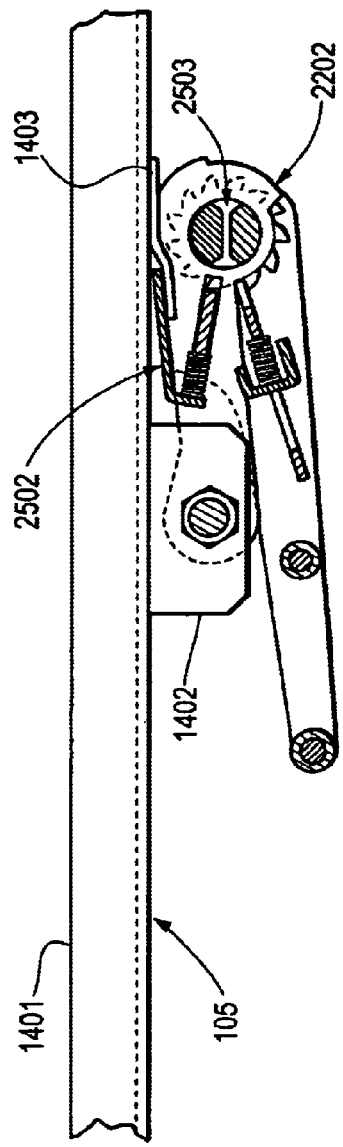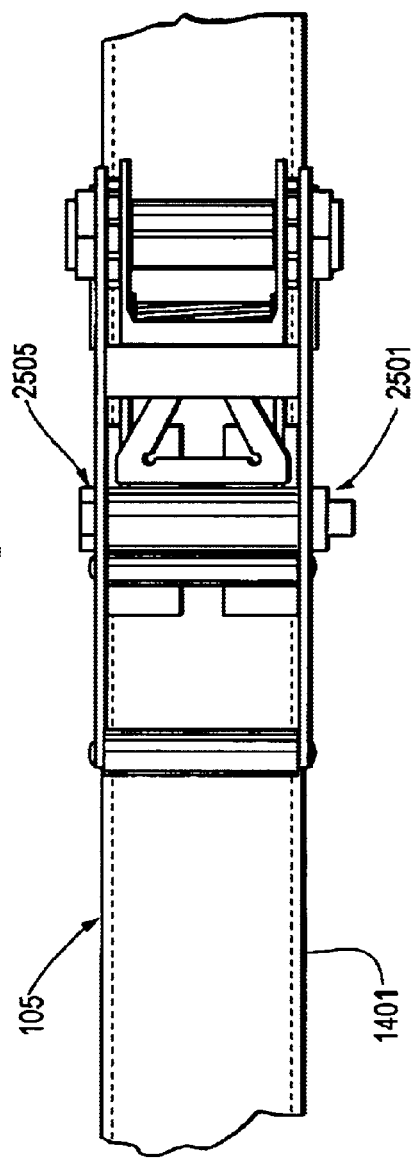

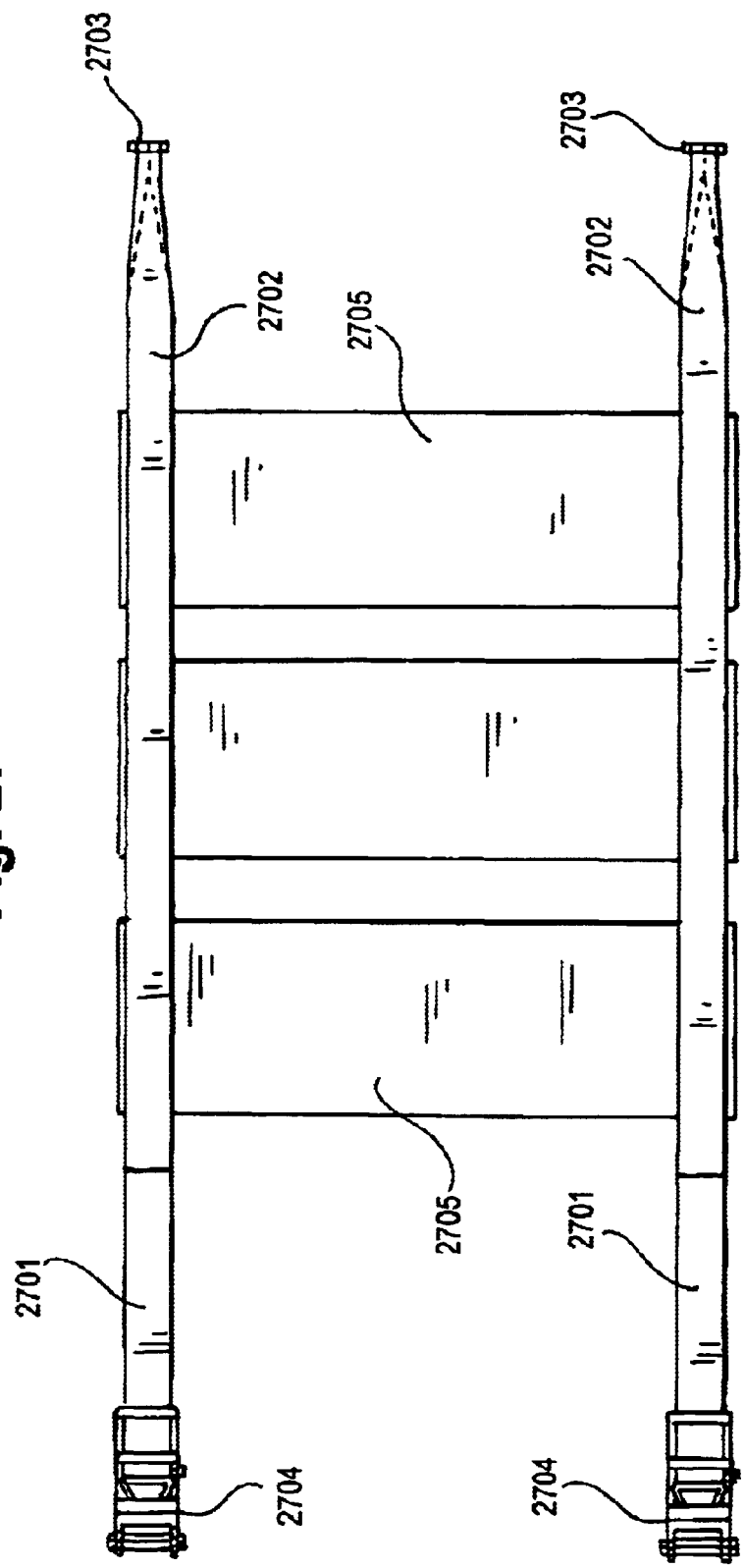

LOAD RESTRAINING DEVICE

CLAIM OF PRIORITY

Priority is claimed based on our Provisional patent application Ser. No. 60/343,106 filed Oct. 25, 2001 and entitled "LOAD RESTRAINING DEVICE."

BACKGROUND OF THE INVENTION

1. Field of the Invention

This invention relates generally to securement of loads and in particular to securement of loads for transport by railcar, and is more particularly directed toward a system for restraining loads in box cars or other transportation vehicles by use of a web strap net and ratchets.

2. Description of Related Art

Loads being transported generally require some type of restraint system in order to prevent damage to both the load and the transportation vehicle. Loads on rail cars need to be restrained from shifting under the various loads imposed by draft, buff, and rocking of the car.

For particular types of loads, such as large rolls or coils of sheet material, or palletized loads, tensioning mechanisms using straps and anchors are advantageous. When cargoes contained in boxes or bags, and arranged on pallets or slip-sheets, are loaded into railcars, some form of cargo restraint is required. One presently known form of load restraint is a movable bulkhead or "door" that can be placed in selected positions along the length of a box car. This bulkhead is held in place by locking pins inserted into floor tracks and ceiling tracks. Adjustment of bulkhead position is facilitated by rollers on a ceiling carriage that engages a ceiling rail or track.

This bulkhead approach has become less popular in recent years due to high maintenance. A bulkhead unit will frequently fail because the unit ceases to roll well, or fails to lock properly. There is also a safety concern, since bulkheads can disengage from the top track and fall, causing injury or death to workers, and damage to railcars and cargoes.

A form of bulkhead restraint system implemented with web strapping and ratchets has been tried on railcars and highway trailers. In this prior art system, the web connects to a side wall via a wall anchor and hook, extends outwardly at an angle of about 90 degrees to a point on the opposite wall of the car or trailer. This portion of the web is connected to the opposite wall via similar wall anchors and hooks. To provide tension in this "bulkhead web," ratchets are provided on the netting itself.

This system has a number of disadvantages, among which are an inherent "cross-car" load distribution that has a tendency to pull car walls in. In addition, the bulkhead web is not easily positioned or adjusted to prevent undesired load shift. Accordingly, a need arises for a load restraining device that is dependable and safe in operation, as well as being economical to install and relatively maintenance-free. The load restraining device should be capable of providing appropriate load tension to prevent load shift, as well as keeping the load centered in the car or trailer to eliminate the need for so-called "center-void" fillers.

SUMMARY OF THE INVENTION

These needs and others are satisfied by the load restraining device of the present invention, in which the known bulkhead restraint system is replaced by web strap netting and ratchets in a unique arrangement. Briefly stated, the load restraint system of the present invention does not rely on the traditional method of a wall anchor and hook, but instead provides a system in which straps extending from one side of a web strap arrangement initially run parallel to the wall to which they are connected, as opposed to extending perpendicular to the wall as in the prior art. The anchor itself is a horizontal wall member running longitudinally along the wall of the railcar or trailer. An adjustable anchor is used to permit moving the attachment point several inches to allow for load variations. The attachment of the netting is normally 14" to 18" behind the face of the load. Unlike previous systems, this provision of anchor points behind the load effectively "encapsulates" the load rather than merely providing a bulkhead. The side of the railcar or trailer that includes these adjustable anchors is termed the "fixed" side and has no ratchets.

The netting is similar to known web strap netting. It has horizontal and vertical web straps (3" wide is used but other widths are possible). It features ends on one side that fit into nut bolts in the wall anchor on the fixed side. The net runs behind the load to these anchoring points, and then around the load in front and over the top if needed. The other side of the net runs behind the load and the straps are fed into rings, which allow the strap ends to be fed into ratchets for tightening. The web strap is not normally secured to the ceiling or floor, but such features could be incorporated under unique circumstances.

The netting of the present invention also features a multitude of vertical straps in positions corresponding to the "corners" of the load (where the netting wraps around the load). This "soft corner protector" provided by this unique web strap geometry is to prevent the horizontal straps from digging into the load at the corners. This soft corner protection feature may also be implemented by providing canvas or other fabric at the sides of the net, about 12" to 18" in width, and extending the full height of the net. Preferably, the canvas or fabric would not extend over the full width of the net as in previous designs. There are no ratchets positioned along the netting itself as in previous systems.

Along the wall opposite the "fixed" anchors is a series of ratchets mounted on the wall horizontally and parallel to the wall. The ratchets may be mounted either permanently or in such a way as to allow easy removal by unscrewing, unbolting or tack weld cutting. Damaged ratchets can thus be removed easily for repair or replacement, if needed.

The netting is connected to the ratchets by taking the horizontal loose strap ends and feeding them around pins, or through adjustable rings, mounted on a horizontal rail parallel to the wall. The rings or pins are preferably located about 10" to 18" behind the load face. This results in the net "encapsulating" the load along the face that abuts the net. The loose ends are then fed into the ratchet and reel bars, and pulled tight to remove any slack, then the ratchet handle is "pumped" to tighten the load to the desired "preload" tension. At unloading, the tension is released, in this case by rotating the ratchet handle 180 degrees. The ratchet is mounted far enough from the load face to permit this operation. Upon unloading and loosening of the net, it is stored on a hanger provided on the same wall as the "fixed" anchors.

Using a web strap netting that starts behind the load instead of the traditional "straight across" method allows the web strap net to pull the load toward the center of the railcar or trailer to prevent load shift. "Behind the load" securement allows load-shifting forces to be taken down the length of the car instead of across the car. This eliminates the potential to pull car walls in. It also keeps the load centered in the car, and thus eliminates the need for center void fillers.

An alternative embodiment utilizing multiple restraining net portions and flush-mounted anchors is also described. In accordance with one embodiment of the present invention, a load restraining system adapted for installation in a cargo transportation vehicle comprises a cargo restraining net including horizontal and vertical strap elements attached at their intersections, and an extension portion proximate an upper edge, the extension portion adapted to engage with one or more corners of a cargo being restrained, a plurality of anchors affixed to a first sidewall of the transportation vehicle, a plurality of strap adjustment mechanisms affixed to an opposing sidewall of the transportation vehicle, a first plurality of web straps extending from a first side of the cargo restraining net and affixed to the plurality of anchors, and a second plurality of web straps extending from a second side of the cargo restraining net and engaged with the plurality of strap adjustment mechanisms. The cargo restraining net firmly restrains the cargo when the strap adjustment mechanisms apply tension to the web straps, each of the first and second plurality of web straps extending from the cargo restraining net to the anchors and strap adjustment mechanisms is substantially parallel to the first and second sidewalls of the transportation vehicle, and the extension portion of the cargo restraining net engages the corners of the cargo to prevent horizontal strap damage to cargo corners.

In accordance with an alternative embodiment of the invention, a removable load restraining system adapted for installation in a cargo transportation vehicle comprises first and second cargo restraining net portions including horizontal and vertical strap elements attached at their intersections, a plurality of anchors substantially flush-mounted to interior sidewalls of the transportation vehicle, web straps extending from a first side of the first cargo restraining net portion and from a second side of the second cargo restraining net portion, the web straps removably engaged with the plurality of anchors, a plurality of strap adjustment mechanisms affixed proximate a first side of the second cargo restraining net portion, and a plurality of web straps extending from a second side of the first cargo restraining net portion and removably engaged with the plurality of strap adjustment mechanisms. The cargo restraining net portions meet along the cargo load face and firmly restrain the cargo when the strap adjustment mechanisms apply tension to the web straps, and each of the web straps extending from the first side of the first cargo restraining net portion and from the second side of the second cargo restraining net portion, in removable engagement with the plurality of anchors, is substantially parallel to the first and second sidewalls of the transportation vehicle.

Further objects, features, and advantages of the present invention will become apparent from the following description and drawings.

BRIEF DESCRIPTION OF THE DRAWINGS

FIG. 1 is a partial plan view of a railroad box car interior;

FIG. 2 is a section view of the box car of FIG. 1, along section lines 2—2;

FIG. 3 is an elevational view of a portion of the interior wall of the box car of FIG. 1;

FIG. 4 is a top view of the wall portion of FIG. 3;

FIG. 5 is an elevational view of another portion of the interior wall of the box car of FIG. 1;

FIG. 6 is a top view of the wall portion of FIG. 5;

FIG. 7 is an enlarged view of a hanger assembly provided on an interior wall of the box car of FIG. 1;

FIG. 8 is a partial plan view of the box car of FIG. 1, illustrating load restraining devices in accordance with the present invention;

FIG. 9 is a partial section view of the box car of FIG. 8 along section lines 9—9;

FIG. 10 is a partial section view of the box car of FIG. 8, along section lines 10—10;

FIG. 14 is a plan view of a ratchet anchor in accordance with the present invention;

FIG. 15 is an elevational view of the ratchet anchor of FIG. 14;

FIG. 16 is a section view of the ratchet anchor of FIG. 15 along section lines 16—16;

FIG. 18 depicts the web strap netting of FIG. 17 in its final form;

FIG. 23 illustrates an alternative embodiment of web strap netting prior to the final fabrication step;

FIG. 24 depicts the web strap netting of FIG. 23 in its final form;

FIG. 25 is a top plan view of a complete ratchet assembly;

FIG. 26 is a side elevational view of the ratchet assembly of FIG. 25;

FIG. 27 illustrates an alternative web strap arrangement in accordance with the present invention;

DETAILED DESCRIPTION OF THE PRIOR EMBODIMENT

Figure 11:
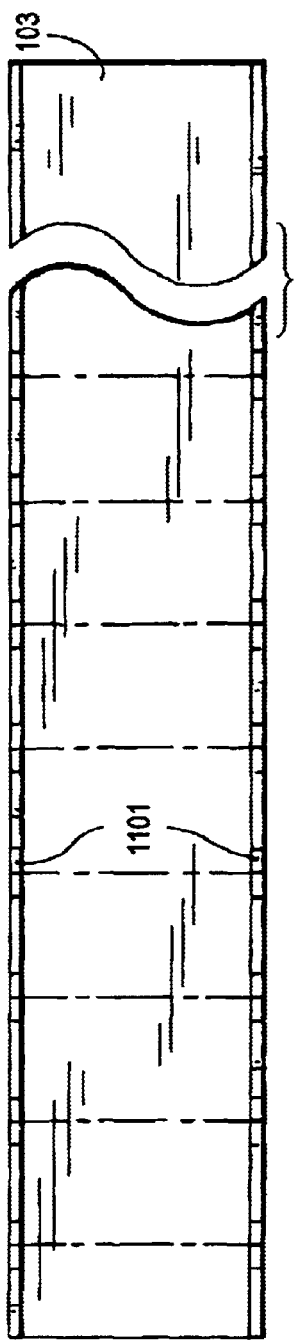
FIGS. 11 is an elevational view of a wall anchor in accordance with the present invention.

FIG. 1 is a partial plan view of the interior portion of a railroad box car 100 that illustrates in detail the anchoring system for the load restraining device of the present invention. Of course, the instant load restraining device is equally useful in a trailer of the type generally used for over-the-road transport, and may have applications in other types of carriage, so it should be understood that the railroad box car installation is set forth as an exemplary embodiment, and is not intended to limit the scope of the invention in any way.

The railroad box car 100 includes vertical members 102 that provide structural integrity for the side wall of the car.

The vertical members 102 are substantially equally spaced along each of the opposing railcar sidewalls, and may be formed from wood, steel, or aluminum, for example. Generally, interior walls 101 for the railcar 100 are constructed from plywood sheets that are attached to the vertical supports by conventional means, such as nails, screws, or other known fasteners. The railroad box car 100 also includes doors 106 located approximately centrally along each sidewall. Of course, the presence of doors 106 and their locations have no particular impact on the present invention.

The anchoring system has been devised such that there are four "fixed side" anchors 103 and four "ratchet side" anchors 104 for each load restraining device installation. There are four such load restraining devices contemplated for the standard railroad box car installation, but there could be more or fewer depending upon the specific application, and the type of transport vehicle into which the devices are installed. For the box car application, there are preferably two retraining devices installed on each side of the railcar lateral centerline (labeled A in FIG. 1).

FIG. 2 is a section view of the box car 100 of FIG. 1, along section lines 2—2. FIG. 2 provides an indication of the preferred vertical separation of the anchors. As can be appreciated from an examination of FIG. 2, the anchors are installed such that the lowest anchor position is about 14" above the floor of the box car 100, with the next anchor about 40" above the floor, the third about 66" above the floor, and the topmost anchor about 92" above the floor (i.e., the anchors are 26" apart). Of course, these spacings are designed for a particular type of load, specifically salt containers that measure about 40"×48"×33" and are arranged in groupings of six, stacked three high by two across. Other vertical spacings of the anchor assemblies 103, 104 may be more suitable for other types of loads.

Figure 20:
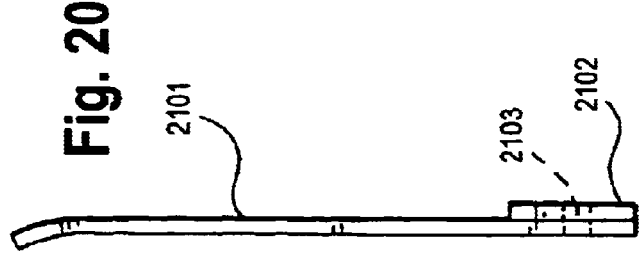
FIG. 20 is an end view of the hanger of FIG. 19.
Figure 19:
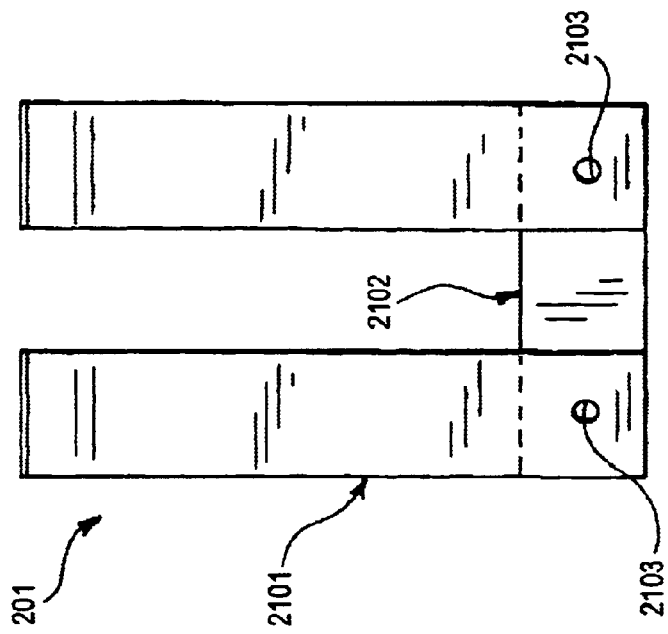
FIG. 19 is an elevational view of a hanger.
Figure 21:
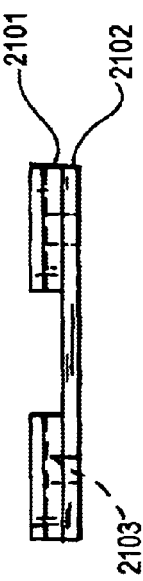
FIG. 21 is a top view of the hanger of FIG. 19.

Hangers 201 (shown in a closer view in FIG. 7), for easy storage of the restraining devices, are provided on the railcar doors 106. Of course, the hangers 201 may be positioned in other convenient locations within the transportation vehicle as well. FIGS. 19–21 illustrate a suitable configuration for the hangers 201. A pair of steel hanger plates 2101, preferably from ⅛" stock and curved outward slightly at one end, are attached (such as by welding, for example) to a transverse steel retainer plate 2102. Holes 2103 are provided through the hanger plates 2101 and retainer plate 2102 for attachment to a door or interior wall of a transportation vehicle.

FIGS. 3 through 6 illustrate how the anchor assemblies 103, 104 are mounted. On the fixed side (FIGS. 5 and 6), a single anchor 103 is mounted between the vertical members 102 of the railcar. It is acknowledged that at least a portion of the interior wall material 101 (FIG. 1) may have to be removed to facilitate installation. The anchor 103 may be bolted or bracketed to the vertical members 102, or even tack welded if the vertical member 102 is formed from steel or other suitable material to facilitate a welding installation. On the ratchet side (FIGS. 3 and 4), the anchor assemblies 104 are of two-part construction. The first part of the ratchet side anchor 104 is the same as the fixed side anchor 103. Adjacent to this first anchor 103, a second anchor, comprising a ratchet support assembly 105, is disposed between the next set of vertical support members 102. Construction of both types of anchors is described below.

Figure 12:
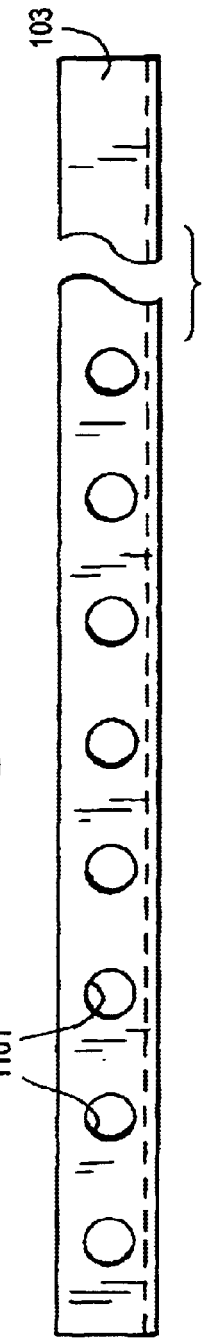
FIG. 12 is a plan view of the wall anchor of FIG. 11.
Figure 13:
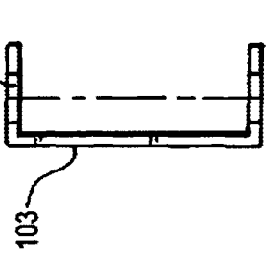
FIG. 13 is an end view of the anchor of FIG. 11.

Each of the fixed side anchors 103, illustrated in FIGS. 11-13, is preferably formed from steel channel stock, C4X5.4 (ASTM A36), although the anchors 103 could be made from other suitable materials of similar strength and structural integrity. Each of the anchors 103 is preferably cut to a length of about 42" for interposition between the vertical support members 102 of the railcar or trailer in which they are installed. Of course, custom length dimensions may be indicated for specific kinds of installations. In their preferred form, sets of eight holes 1101 are provided along the length of the anchor 103. The holes 1101 are designed to accommodate bolts (ø¾, 10×6, grade 8, preferably, although not shown in the drawings) to secure the web strap netting 801 at the fixed end. One of the holes 1101 in each set may be threaded to accommodate a threaded bolt for greater security, although this would not always be necessary. This aspect of the present invention will be discussed in detail in a subsequent paragraph.

As mentioned previously, the "ratchet side" requires one of the fixed side anchors 103 and a ratchet support assembly 105, which is depicted in detail in FIGS. 14–16. The ratchet support assembly is preferably formed from a length of steel channel stock 1401 of the same specifications as that of the fixed anchor 103, and cut to the same length. A pair of ratchet support brackets 1402 is affixed to the front face of the channel 1401, and provided with holes 1404 therethrough for attachment of the ratchet itself (not illustrated in the figure). A support plate 1403 is also affixed to the channel 1401 adjacent to the brackets 1402. Attachment of the brackets 1402 and plate 1403 may be accomplished by welding or other suitable means.

FIGS. 25 and 26 illustrate the way in which the ratchet 2202 is mounted on the ratchet support assembly 105. A securing bracket 2502 is engaged behind support plate 1403, and a ratchet locating and securing bolt 2501 is then passed through the ratchet support bracket 1402 (and also through securement holes provided on the ratchet 2202), and a tack weld 2505 is formed to hold the ratchet 2202 in place.

FIGS. 8–10 illustrate load restraining devices in operation. As can be appreciated from an examination of the figures, the anchor assemblies 103, 104 are used to bring a web strap net 801 to bear upon the face 803 of the load 802. As discussed above, the configuration illustrated is particularly advantageous when employed with a packaged salt load 802 that is arranged in layers of six packages that are stacked three high. It will become clear in light of the subsequent description of operation how the web strap net 801 provides effective load restraint, that applies a restraining force away from the car centerline A, while avoiding a cross-car load that may tend to bow the car sidewalls inward.

Figure 17:
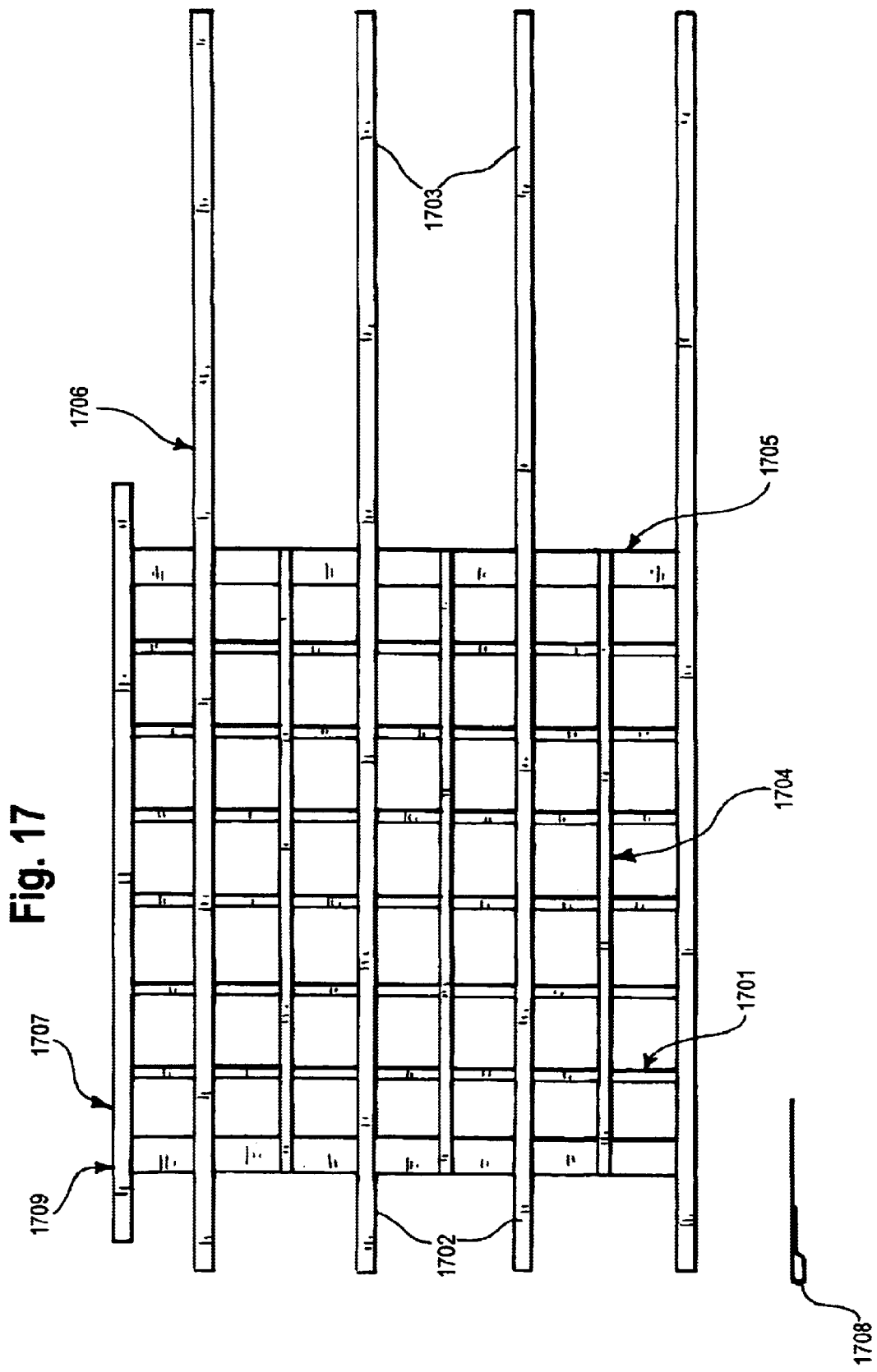
FIG. 17 illustrates web strap netting prior to the final fabrication step.

The configuration of the web strap net 801 itself is shown in FIG. 17. Preferably, the net 801 is constructed from polyester web straps of varying lengths and widths that are sewn together at their intersections as illustrated. In its preferred form, the web strap net 801 is based around four horizontal straps 1706 that are about 206" long and 3" wide. Approximately 18" from one end (the "fixed" end) of these horizontally arranged straps 1706, a 12" wide section of web strap 1709 is sewn to the horizontal straps 1706 such that the horizontal straps 1706 are spaced apart by about 26 inches. This vertical strap 1709 is allowed to overlap the uppermost horizontal strap 1706 by about 13" for a reason that will become clear in the subsequent section.

A second vertical 12" strap 1705 is laterally spaced from the first vertical strap 1709 by about 96 inches, and is also arranged to overlap the uppermost horizontal strap. The interior portion of the web strap net is comprised of a series of vertical straps 1701, approximately 2" wide and spaced about 14" apart, in conjunction with a similar arrangement of horizontal 2" straps 1704, spaced apart at the same distance. The vertical straps 1701 are also allowed to extend beyond the topmost horizontal strap 1706 by about 13 inches, and an additional 3" strap 1707 is sewn to the ends of these vertical straps 1701 and allowed to overlap on the ends by about 12 inches.

As shown in FIG. 18, the short extensions of the horizontal strap 1707 are folded over and sewn to the uppermost of the long horizontal straps 1706. This operation creates a region 1801 in the finished net 801 that includes a multitude of vertical strap sections secured to the upper strap 1706 by short oblique strap sections 1802, 1803. This folded over section 1801 provides a network of vertical straps that settle over the upper edge and upper corners of a load 802, serving as corner protectors that forestall the tendency of the horizontal straps 1706 to "dig" into load corners.

The horizontal straps 1706 include short extensions 1702 that extend beyond the first vertical strap 1709 by about 18 inches, and are terminated in loops or eyes 1708 that are formed by folding over the strap material 1702 and sewing the material together in the "sewing area" illustrated in FIG. 17. The opposing ends 1703 of the horizontal straps 1706 extend beyond the nearest vertical strap 1705 by about 92 inches. These longer extensions 1703 are intended to interconnect with the ratchet anchor assemblies 104 provided on the side of the transport vehicle opposite the fixed side.

In an alternative form, the strap ends 1702 can also be equipped with steel rings 2301, as shown in FIGS. 23 and 24. The steel rings 2301 are securely sewn onto the straps, preferably by folding the strap around the ring and sewing it securely. Of course, the rings 2301 could also be fastened to the straps by other, equally secure, methods.

Figure 22:
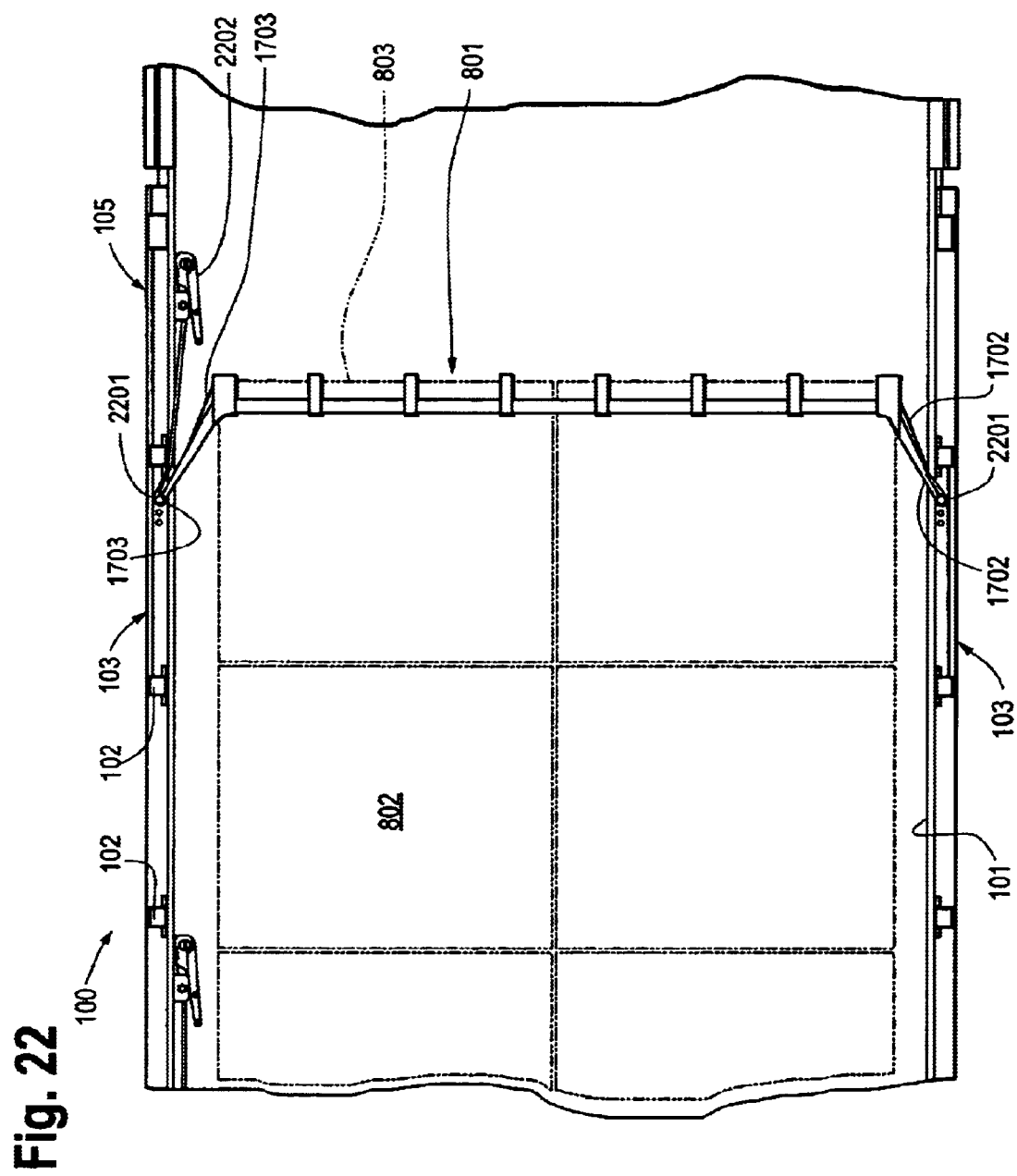
FIG. 22 is an expanded view of a portion of the interior of the box car of FIG. 8, illustrating operation of a load restraining device in accordance with the present invention.

FIG. 22 illustrates the load restraining device of the present invention in operation. Each of the shorter web straps 1702 (terminating in loops 1708, or rings 2301, for example) is attached to its corresponding fixed anchor 103 by passing a bolt 2201 through the loop 1708 or ring 2301 and attaching the bolt to the anchor 103. It should be noted that the net 801 is then led around the face 803 of the load 802, and the strap extensions 1703 on the opposite side of the net 801 are led around bolts 2201 suitably positioned in anchor assemblies 103 on the opposing wall. These straps 1703 are then led into ratchets 2202 mounted on the ratchet support assemblies 105. The straps are tightened to apply a restraining force to the load face 803 away from the lateral centerline of the box car in which the load is being transported. The bolts 2201 are positioned "behind" the load face 803 (on the side opposite the car centerline for box car installations). The straps 1703 are disposed parallel to the interior walls 101 of the railcar 100, thus ensuring that the restraining force applied to the load 802 will not induce a cross-car load that could bow the railcar walls inward.

In operation (referring also to FIGS. 25 and 26), the straps 1703 are fed through the reel bars 2503 of the ratchets 2202 in order to eliminate slack. The handle of the ratchet 2202 is then operated back and forth until the webbing is properly tensioned. Preferably, the reel bars 2503 have at least two wraps of webbing to help ensure that no slippage occurs. To release tension on the webbing, a pawl provided on the handle is pulled back, and the handle is rotated over center to the full open position.

Of course, the use of the load restraining device is not limited to railcar applications. The inventive system is readily adaptable to over-the-road trailers, even those where cargoes are loaded and unloaded through a single rear door. In those applications, the bolts 2201 are disposed on the side of the load face 803 that is away from the rear door of the trailer. Thus, the load restraining device will forestall undesirable shifting of cargoes toward the loading door in such over-the-road trailer installations.

Of course, there are situations in which the permanent mounting of ratchet assemblies to the interior sidewalls of transport vehicles (such as railcars) cannot be tolerated. This is true, for example, for multiple use railroad boxcars that may carry various types of loads. Permanently installed ratchets would protrude into the cargo space and could cause damage to some types of cargoes, as well as interfering with the loading of certain cargoes that actually require the entire boxcar width for proper accommodation.

FIG. 27 depicts a web strap net that forms a portion of a completely removable restraint system that satisfies the constraints introduced above. The web strap net of FIG. 27 features a pair of horizontally disposed 4-inch polyester web straps 2701, with ratchet assemblies 2704 affixed to first ends thereof. 12-inch wide vertical web straps 2705 are secured to the horizontal straps 2701. Because this alternative restraint system is designed to be removable, each of the components is constructed so as to be relatively light in weight. Consequently, the web strap net of FIG. 27 is preferably only about 80 inches long. At the strap ends 2702 opposite the ratchet assembles 2704, securement pins 2703, preferably of steel construction, are affixed within a tapered end of the web strap so that the ends of the pins 2703 protrude. Preferably, the pins 2703 are installed by looping the fabric of the strap 2701 around the pin 2703 and sewing securely, although other methods of securing the pins 2703 in position may also be devised.

As noted, because this alternative restraint system is designed to be removable, the web strap nets themselves are provided in sections. The large nets described above in conjunction with the previous embodiment would simply be too heavy, once encumbered with ratchet assemblies, to function satisfactorily in a removable environment. Consequently, the web strap net configuration illustrated in FIG. 28 is designed to mate with the net of FIG. 27.

Figure 28:
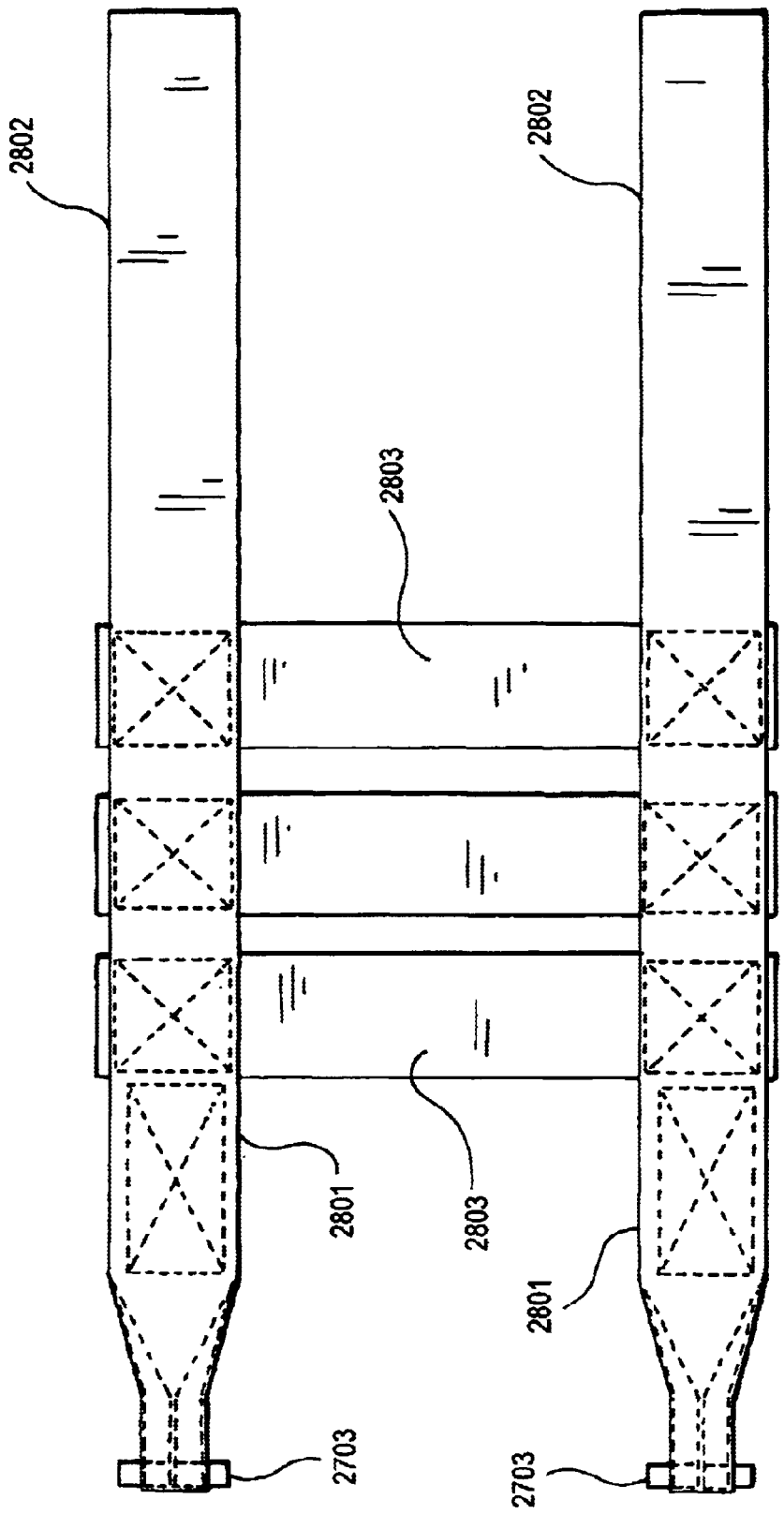
FIG. 28 shows an alternative web strap arrangement designed to interconnect with the web strap of FIG. 27.

Since the web strap net of FIG. 28 does not include ratchets (these are provided on the mating structure of FIG. 27), this particular web strap net of FIG. 28 is intended to be the longer of the two removable sections. Preferably, the web strap net of FIG. 28 is about fourteen feet in length. The web straps 2801 are preferably formed from 4-inch polyester material. 12-inch wide vertical strap sections 2803 are secured to the horizontal straps 2801. At first ends of the straps 2801, securement pins 2703 are attached to the straps 2801 in much the same fashion described in conjunction with FIG. 27. The anchor mechanism used with the securement pins 2703 will be described in more detail below.

The vertical strap sections 2803 are positioned relatively close to the securement pin 2703 ends of the straps 2801. The wide vertical straps 2803 are employed because of uncertainty regarding the precise corner locations for various cargoes, and it is believed that this structure provides a wide range of corner support to meet most eventualities. A relatively long run of free strap ends 2802 is designed to extend along the cargo frontage and mate with the ratchet assemblies 2704 of the mating web strap section. Since the ratchet assembles 2704 and the free strap ends will mate and engage with each other at a point along the frontage (or face) of the cargo, it is contemplated that a cushioning material, such as cardboard dunnage sheets, for example, will be inserted between the ratchets and the load face in order to avoid damage to the cargo.

Figure 29:
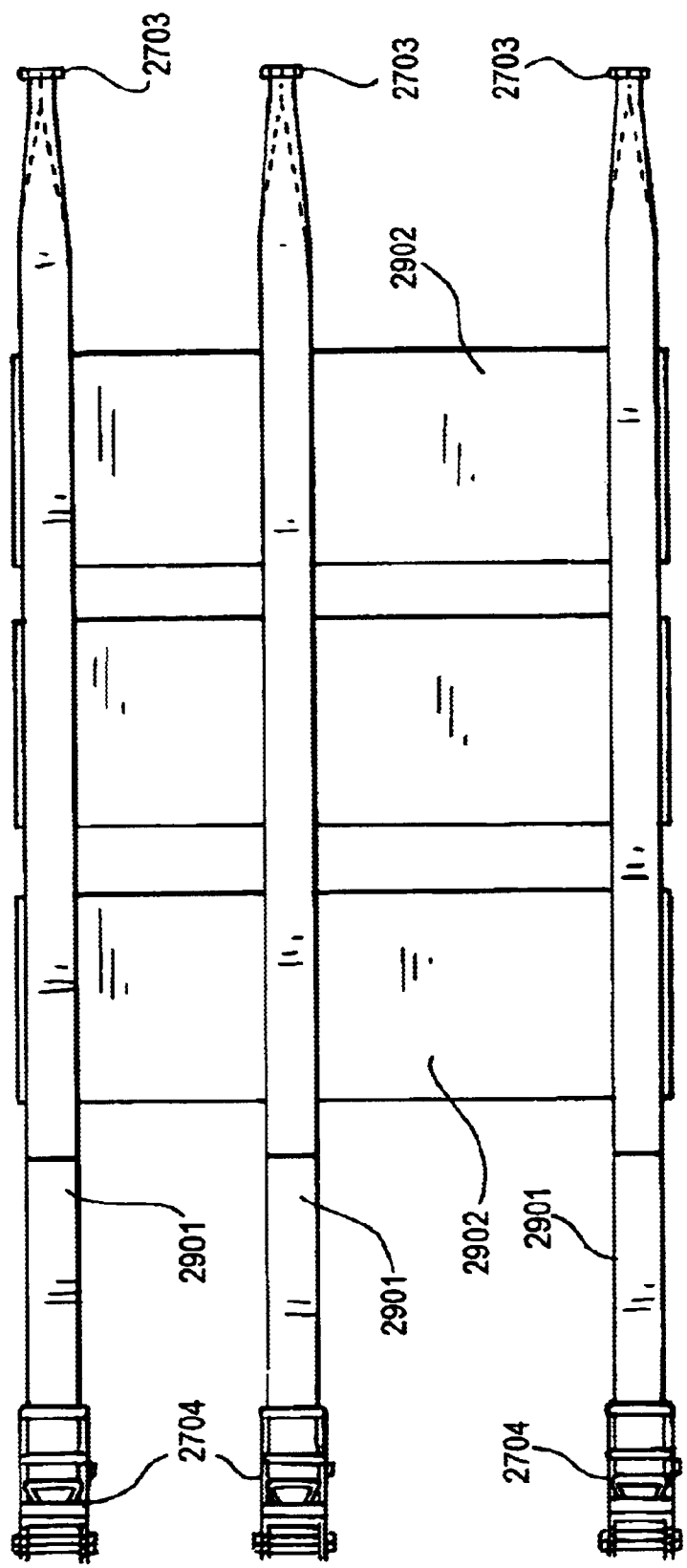
FIG. 29 depicts yet another alternative web strap arrangement in accordance with the present invention.

Alternative web strap net configurations are also provided. FIG. 29 illustrates a web strap net having three horizontal 4-inch polyester web straps 2901, unequally spaced at 21 inches and 23 inches apart. Of course, many different spacings may be selected without diminishing the effectiveness of the present restraint system. The web strap net of FIG. 29 includes a plurality of 12-inch wide vertical web straps 2902 secured to the horizontal straps 2901. At first ends of the web straps 2901, ratchet assemblies 2704 are provided, while at the strap ends opposite from the ratchets 2704, securement pins 2703 are provided in the manner described above. A three-strap net configuration similar to the net of FIG. 28 (except with three horizontal straps arranged in the same vertical spacing as those of FIG. 29) is contemplated, but is not illustrated in a drawing figure. It is believed that utilizing more that three horizontal straps in a web strap net, particularly for the section having ratchet assemblies, renders the net too heavy for easy removability.

Figure 30:
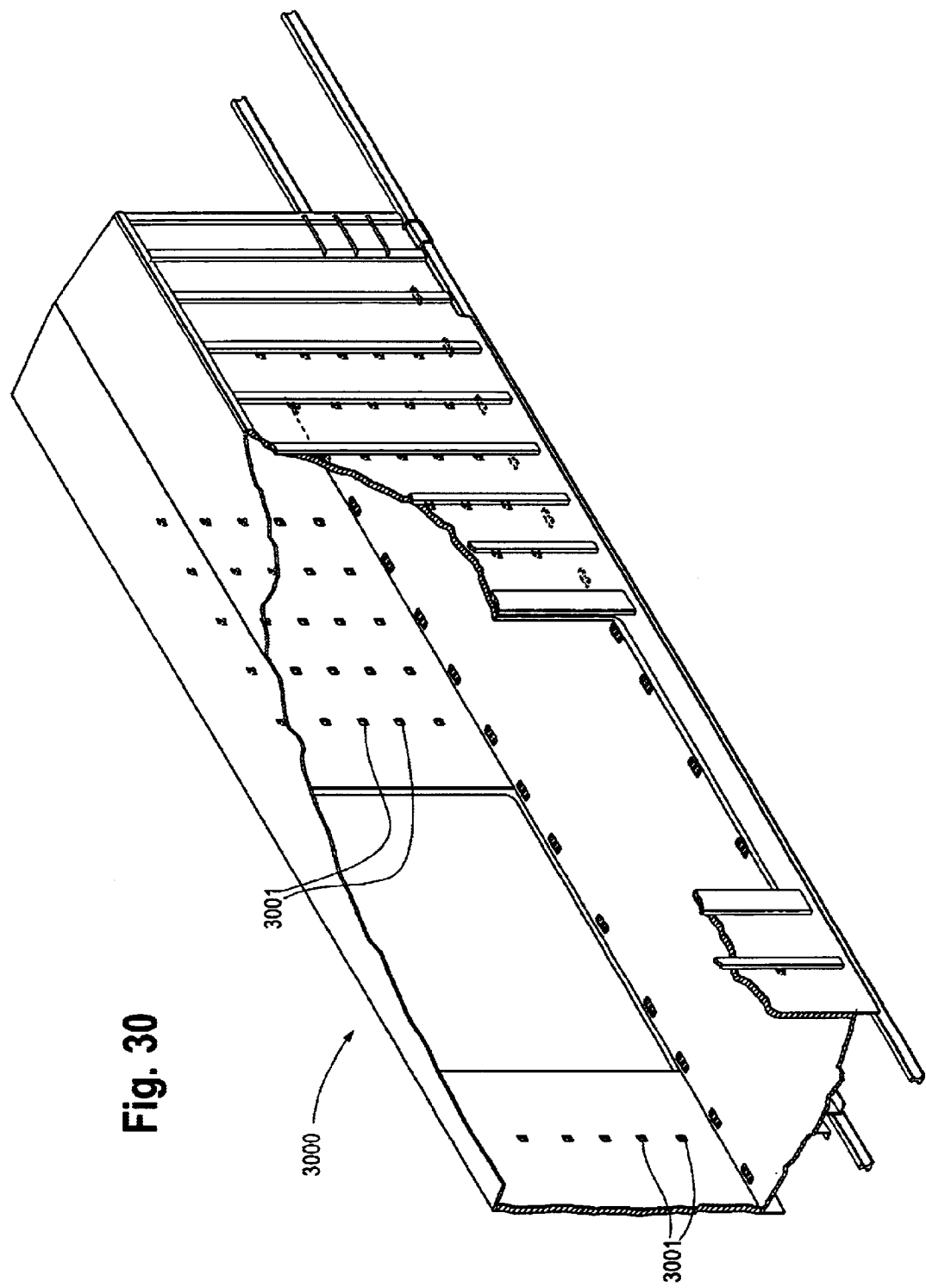
FIG. 30 is a perspective, partially cut-away view of a railcar illustrating anchor placement.

FIG. 30 depicts a railroad boxcar 3000 in a perspective, cut-away view that permits the flush-mounted wall anchors 3001 to be seen on the interior walls of the railcar. Construction and operation of these flush mounted anchors is described in detail in U.S. Pat. No. 6,422,794, issued Jul. 23, 2002, and fully incorporated by reference thereto as if fully set forth herein.

Figure 31:
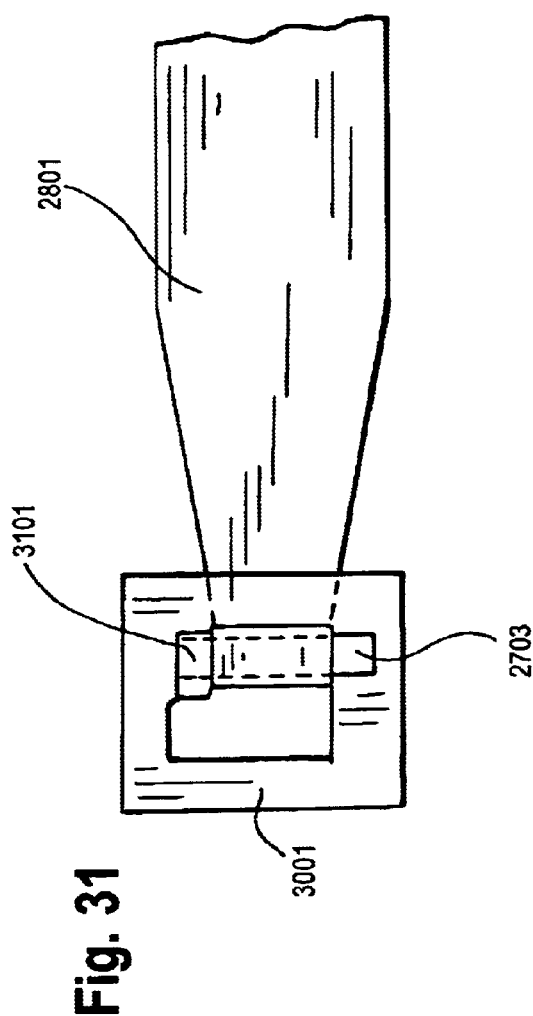
FIG. 31 is a top plan view of a web strap in engagement with an anchor.
Figure 32:
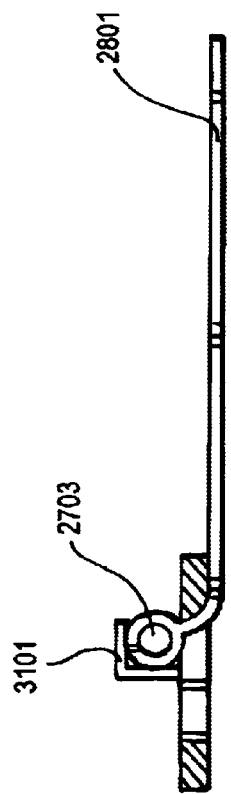
FIG. 32 is a side elevational view of the web strap and anchor of FIG. 31.

FIGS. 31 and 32 depict a web strap 2801 of a web strap net secured to the anchor 3001. It can be appreciated that the securement pin 2703 holds the web strap in the anchor 3001, and clip member 3101 prevents the securement pin 2703 from rotating and slipping through the anchor 3001. Of course, the anchor shown is intended to be exemplary, and other flush-mounted anchor systems that firmly secure the web strap nets in position while permitting easy removability may function adequately in the restraint system described.

Using the web strap nets described above, removable restraint configurations can be easily achieved featuring various combinations of horizontal straps to accommodate a variety of loads. For example, using the plurality of anchors provided in the railcar of FIG. 30, one could devise a removable restraint system in which a pair of lower web strap nets having three horizontal straps each, combined with a pair of upper web strap nets having a pair of horizontal straps each, provides a total of 5 horizontal straps across the cargo being secured, but is still easily removable, and is relatively light in weight because it is provided in four sections. Other configurations of horizontal straps, such as single 2- or 3-strap nets, or a six-strap net comprised of two pairs of three-strap nets, are easily installed and removed after use utilizing the restraint system of the present invention.

There has been described herein a load restraining device that offers distinct advantages when compared with the prior art. It will be apparent to those skilled in the art that modifications may be made without departing from the spirit and scope of the invention. For example, the illustration and description of the present invention in a railcar installation is not intended to limit the invention to railcar applications alone.

What is claimed is:

1. A load restraining system adapted for installation in a cargo transportation vehicle comprising:
    a cargo restraining net including horizontal and vertical strap elements attached at their intersections, and an extension portion proximate an upper edge, said extension portion adapted to engage with one or more corners of a cargo being restrained;
    a plurality of anchors affixed to a first sidewall of the transportation vehicle;
    a plurality of strap adjustment mechanisms affixed to a second sidewall of the transportation vehicle;
    a first plurality of web straps extending from a first side of the cargo restraining net and affixed to the plurality of anchors, and
    a second plurality of web straps extending from a second side of the cargo restraining net and engaged with the plurality of strap adjustment mechanisms;
    such that the cargo restraining net firmly restrains the cargo when the strap adjustment mechanisms apply tension to the web straps, each of the first and second plurality of web straps extending from the cargo restraining net to the anchors and strap adjustment mechanisms is substantially parallel to the first and second sidewalls of the transportation vehicle, and the extension portion of the cargo restraining net engages the corners of the cargo to prevent horizontal strap damage to the cargo corners.

2. The load restraining system of claim 1, wherein the cargo restraining net is formed from polyester web strap material.

3. The load restraining system of claim 1, wherein each of the plurality of anchors comprises a steel channel having a plurality of pairs of openings extending through both sidewalls of the channel each of said pairs of openings adapted to accommodate a bolt extending through both said sidewalls.

4. The load restraining system of claim 1, wherein each of said plurality of strap adjustment mechanisms comprises a ratchet assembly.

5. The removable load restraining system of claim 1, wherein the first and second plurality of web straps are formed from polyester web strap material.

6. The removable load restraining system of claim 1, wherein each of the plurality of anchors comprises a plate portion that is flush mountable in a transportation vehicle sidewall, said plate portion including an "L" shaped aperture designed to accommodate a securement pin, and further including an upstanding clip portion that retains, at least in part, said securement pin in position.

7. The removable load restraining system of claim 6, wherein each of the web straps extending from the first side of the first cargo restraining net portion and from the second side of the second cargo restraining net portion terminates in a securement pin adapted to engage with one of the plurality of anchors.

8. The removable load restraining system of claim 7, wherein each securement pin is attached to a corresponding web strap by looping the web strap end around the securement pin, leaving a portion of each end of the securement pin exposed.

9. A load restraining system adapted for installation in a cargo transportation vehicle comprising:
    a cargo restraining net including horizontal and vertical strap elements attached at their intersections, and an extension portion proximate an upper edge, said extension portion adapted to engage with one or more corners of a cargo being restrained;
    a plurality of anchors affixed to a first sidewall of the transportation vehicle;
    a plurality of strap adjustment mechanisms affixed to a second sidewall of the transportation vehicle;
    a first plurality of web straps extending from a first side of the cargo restraining net and affixed to the plurality of anchors, and
    a second plurality of web straps extending from a second side of the cargo restraining net and engaged with the plurality of strap adjustment mechanisms;
    such that the cargo restraining net firmly restrains the cargo when the strap adjustment mechanisms apply tension to the web straps, each of the first and second plurality of web straps extending from the cargo restraining net to the anchors and strap adjustment mechanisms is substantially parallel to the first and second sidewalls of the transportation vehicle, and the extension portion of the cargo restraining net engages the corners of the cargo to prevent horizontal strap damage to the cargo corners; wherein the extension portion of the cargo restraining net is formed by providing extended vertical strap elements, terminating the extended vertical strap elements on a horizontal strap portion having ends that extend a relatively short distance beyond the first and second sides of the cargo restraining net, then folding over the extension portion and securing the ends of the horizontal strap portion to one of the nearest horizontal strap elements.

10. A load restraining system adapted for installation in a cargo transportation vehicle comprising:

a cargo restraining net including horizontal and vertical strap elements attached at their intersections, and an extension portion proximate an upper edge, said extension portion adapted to engage with one or more corners of a cargo being restrained;

a plurality of anchors affixed to a first sidewall of the transportation vehicle;

a plurality of strap adjustment mechanisms affixed to a second sidewall of the transportation vehicle;

a first plurality of web straps extending from a first side of the cargo restraining net and affixed to the plurality of anchors, and a second plurality of web straps extending from a second side of the cargo restraining net and engaged with the plurality of strap adjustment mechanisms;

such that the cargo restraining net firmly restrains the cargo when the strap adjustment mechanisms apply tension to the web straps, each of the first and second plurality of web straps extending from the cargo restraining net to the anchors and strap adjustment mechanisms is substantially parallel to the first and second sidewalls of the transportation vehicle, and the extension portion of the cargo restraining net engages the corners of the cargo to prevent horizontal strap damage to the cargo corners; wherein each of the plurality of anchors comprises a steel channel having a plurality of pairs of openings extending through sidewalls of the channel, each of the pairs of openings adapted to accommodate a bolt extending through both said sidewalls; and each of the first plurality of web straps extending from the first side of the cargo restraining net and affixed to the plurality of anchors is terminated in a steel ring adapted to engage the bolt.

11. The load restraining system of claim 10, wherein each of the anchors is positioned behind the load face of the cargo being restrained.

12. A load restraining system adapted for installation in a cargo transportation vehicle comprising:

a cargo restraining net including horizontal and vertical strap elements attached at their intersections, and an extension portion proximate an upper edge, said extension portion adapted to engage with one or more corners of a cargo being restrained;

a plurality of anchors affixed to a first sidewall of the transportation vehicle;

a plurality of scrap adjustment mechanisms affixed to a second sidewall of the transportation vehicle;

a first plurality of web straps extending from a first side of the cargo restraining net and affixed to the plurality of anchors, and a second plurality of web straps extending from a second side of the cargo restraining net and engaged with the plurality of strap adjustment mechanisms;

such that the cargo restraining net firmly restrains the cargo when the strap adjustment mechanisms apply tension to the web straps, each of the first and second plurality of web straps extending from the cargo restraining net to the anchors and strap adjustment mechanisms is substantially parallel to the first and second sidewalls of the transportation vehicle, and the extension portion of the cargo restraining net engages the corners of the cargo to prevent horizontal strap damage to the cargo corners; wherein each of the plurality of strap adjustment mechanisms includes an associated anchor assembly comprising a steel channel having a plurality of openings extending through both sidewalls of the channel, each of said pairs of openings adapted to accommodate a bolt extending through both said sidewalls, said anchor assembly disposed on the second sidewall of the transportation vehicle at a point behind the load face of the cargo being restrained and positioned such that each of said second plurality of web straps extending from the second side of the cargo restraining net passes around the bolt, extends along the second sidewall, and engages with one of said strap adjustment mechanisms forward of the cargo load face.

13. A load restraining system adapted for installation in a cargo transportation vehicle comprising:

a cargo restraining net including horizontal and vertical strap elements attached at their intersections, and an extension portion proximate an upper edge, said extension portion adapted to engage with one or more corners of a cargo being restrained;

a plurality of anchors affixed to a first sidewall of the transportation vehicle;

a plurality of strap adjustment mechanisms affixed to a second sidewall of the transportation vehicle;

a first plurality of web straps extending from a first side of the cargo restraining net and affixed to the plurality of anchors, and a second plurality of web straps extending from a second side of the cargo restraining net and engaged with the plurality of strap adjustment mechanisms;

such that the cargo restraining net firmly restrains the cargo when the strap adjustment mechanisms apply tension to the web straps, each of the first and second plurality of web straps extending from the cargo restraining net to the anchors and strap adjustment mechanisms is substantially parallel to the first and second sidewalls of the transportation vehicle, and the extension portion of the cargo restraining net engages the corners of the cargo to prevent horizontal strap damage to the cargo corners; wherein a. the cargo restraining net is formed from polyester web strap material; wherein b. each of the plurality of anchors comprises a steel channel having a plurality of pairs of openings extending through both sidewalls of the channel each of said pairs of openings adapted to accommodate a bolt extending through both said sidewalls; wherein c. each of said plurality of strap adjustment mechanisms comprises a ratchet assembly and wherein d. the first and second plurality of web straps are formed from polyester web strap material.

* * * * *